(12) United States Patent
Kulkarni et al.

(10) Patent No.: US 9,085,687 B2
(45) Date of Patent: Jul. 21, 2015

(54) POLYCARBONATE BLENDS HAVING IMPROVED ELECTROPLATE ADHESION

(75) Inventors: Amit S. Kulkarni, Evansville, IN (US); Thomas Dulmage, Orchard Lake, MI (US); Jeffrey Eshenaur, Hamilton, MI (US)

(73) Assignee: SABIC Global Technologies B.V., Bergen op Zoom (NL)

(*) Notice: Subject to any disclaimer, the term of this patent is extended or adjusted under 35 U.S.C. 154(b) by 171 days.

(21) Appl. No.: 13/365,980

(22) Filed: Feb. 3, 2012

(65) Prior Publication Data

US 2013/0203909 A1  Aug. 8, 2013

(51) Int. Cl.
| | |
|---|---|
| *C09J 169/00* | (2006.01) |
| *C09J 153/02* | (2006.01) |
| *C09J 155/02* | (2006.01) |
| *C08L 69/00* | (2006.01) |
| *C08L 55/02* | (2006.01) |
| *C08L 51/04* | (2006.01) |

(52) U.S. Cl.
CPC .............. *C08L 69/00* (2013.01); *C09J 153/02* (2013.01); *C09J 155/02* (2013.01); *C09J 169/00* (2013.01); *C08L 51/04* (2013.01); *C08L 55/02* (2013.01); *C08L 2205/02* (2013.01)

(58) Field of Classification Search
CPC ...... C09J 169/00; C09J 153/02; C09J 155/02; C08L 69/00; C08L 55/02; C08L 51/04; C08L 2205/025
USPC .......................................... 524/526, 504, 515
See application file for complete search history.

(56) References Cited

U.S. PATENT DOCUMENTS

| | | | |
|---|---|---|---|
| 3,539,306 A | 11/1970 | Imataki et al. | |
| 3,650,704 A | 3/1972 | Kumura et al. | |
| 4,351,814 A | 9/1982 | Miyata et al. | |
| 4,847,153 A | 7/1989 | Grigo et al. | |
| 6,291,570 B1 | 9/2001 | Katsuki et al. | |
| 6,503,628 B1 | 1/2003 | Janarthanan et al. | |
| 7,786,246 B2 | 8/2010 | Jansen et al. | |
| 7,935,737 B2 | 5/2011 | Gopal et al. | |
| 2005/0004292 A1* | 1/2005 | Harashina et al. | ............ 524/430 |
| 2006/0004154 A1* | 1/2006 | DeRudder et al. | ............ 525/469 |
| 2006/0079615 A1* | 4/2006 | DeRudder et al. | ............ 524/128 |
| 2009/0226727 A1 | 9/2009 | Higaki | |
| 2009/0292083 A1* | 11/2009 | Zhang | .......................... 525/92 E |

FOREIGN PATENT DOCUMENTS

| | | |
|---|---|---|
| CA | 2334998 A1 | 12/1999 |
| JP | 6322545 A | 11/1994 |
| JP | 11181269 A | 7/1999 |
| JP | 2006299089 A | 11/2006 |
| JP | 2006328134 A | 12/2006 |
| JP | 2007153915 A | 6/2007 |
| JP | 2008505220 A | 2/2008 |
| WO | WO-95/02504 | 1/1995 |
| WO | WO-99/65991 | 12/1999 |
| WO | WO-2006/014283 | 2/2006 |

OTHER PUBLICATIONS

International Search Report and Written Opinion issued by the International Bureau on Feb. 18, 2013 for PCT/US2012/067010 filed on Nov. 29, 2012 (Applicant—Sabic Innovative Plastics IP B.V. // pp. 1-14).

* cited by examiner

*Primary Examiner* — Ling Choi
*Assistant Examiner* — Ronald Grinsted
(74) *Attorney, Agent, or Firm* — Baker & Hostetler LLP

(57) ABSTRACT

The present disclosure relates to thermoplastic polycarbonate blends compositions having, among other characteristics, improved electroplate adhesion properties. In particular, the disclosure relates to such polycarbonate compositions comprising a polycarbonate component, a primary ABS impact modifier, and a secondary impact modifier chemically different from the primary impact modifier. Also included herein are methods for preparing and/or using the same, as well as articles formed from such compositions/blends.

36 Claims, 2 Drawing Sheets

POLYCARBONATE BLENDS HAVING IMPROVED ELECTROPLATE ADHESION

BACKGROUND OF THE INVENTION

Acrylonitrile-butadiene-stryrene (ABS) and corresponding blends of polycarbonate and acrylonitrile-butadiene-stryrene (PC/ABS) are routinely used as substrate parts in various electroplating applications, including for example in the manufacture of parts for the automotive sector. Typical automotive parts that undergo a chemical electroplating process include wheel-covers, door-handles, truck-grilles, tail lamp bezels and OEM logos. This decorative finishing serves a dual purpose of achieving aesthetic appeal along with added functionality of providing added protection against and resistance to environmental factors.

Acrylonitrile-butadiene-stryrene (ABS) polymers are derived from acrylonitrile, butadiene, and styrene monomers. ABS materials generally exhibit excellent impact resistance and toughness. In particular, ABS materials combine the strength and rigidity of the acrylonitrile and styrene polymers with the toughness of the polybutadiene rubber. Additionally, ABS exhibits excellent electroplate adhesion values. However, when compared to polycarbonate and ABS blends, neat acrylonitrile-butadiene-stryrene is typically used for applications with less stringent mechanical properties, such as tensile, flexural, heat, and fatigue requirements.

Polycarbonates (PC) are synthetic thermoplastic resins derived from bisphenols and phosgenes, or their derivatives. They are linear polyesters of carbonic acid and can be formed from dihydroxy compounds and carbonate diesters, or by ester interchange. Polymerization may be in aqueous, interfacial, or in nonaqueous solution. Polycarbonates are a useful class of polymers having many desired properties. They are highly regarded for optical clarity and enhanced impact strength, high heat resistance, and relative ductility at room temperature or below.

Blends of polycarbonates with ABS (PC/ABS) are amorphous thermoplastic blends that exhibit many desired properties combining the advantages and/or characteristics of both polycarbonate and ABS. For example, ABS can be incorporated into a polycarbonate blend as an impact modifier resulting in a PC/ABS blend having relatively high impact strength, heat resistance, good processability, weather and ozone resistance, good ductility, electrical resistance, aesthetic characteristics, etc. However, the polycarbonate component in PC/ABS blends typically leads to lower electroplate adhesion values of the resultant metal electroplated layers to the plastic substrate compared to neat ABS. Without wishing to be bound by theory, it is believed this is explained on the basis of butadiene and acrylonitrile from the ABS portion of the blend being the active species governing adhesion values. In contrast, the presence of excessive polycarbonate in a PC/ABS blend can lead to "bald-spots" of butadiene-deficient areas on molded surfaces where little or no metal-to-plastic adhesion is achieved, leading to possible failures such as worm-tracking, blistering, thermal-cycle, thermal-shock failures etc. Though various factors related to processing of the PC/ABS blends in secondary operations like injection-molding, as well as the electroplating process itself have a significant effect on the electroplate adhesion, the composition of the blend is considered to be one of the significant contributors to the final adhesion between the metal and plastic surface.

Accordingly, there remains a need in the art for thermoplastic blends of polycarbonate and acrylonitrile-butadiene-stryrene (ABS) exhibiting improved electroplate adhesion values notwithstanding the presence of polycarbonate in the blend. Additionally, there also remains a need in the art for methods that enable the manufacture of PC/ABS blends exhibiting relatively increased levels of polycarbonate without reducing or adversely impacting the desired level of electroplate adhesion. These and other advantages are provided by various aspects of the present disclosure.

SUMMARY OF THE INVENTION

This invention relates generally to thermoplastic compositions comprising polycarbonate and an acrylonitrile-butadiene-styrene impact modifier. The disclosed compositions comprise a primary and secondary impact modifier and, as such, are capable of exhibiting improved electroplate adhesion values as compared to a reference blend composition in the absence of the secondary impact modifier. In further aspects, the incorporation of two different impact modifiers also enables the manufacture of blends comprising increased amounts of polycarbonate component while still maintaining or even improving the electroplate adhesion values relative to a reference blend.

In various aspects, disclosed are thermoplastic compositions with improved electroplate adhesion comprising from about 40 wt % to about 75 wt % of one or more polycarbonate resins, from about 24 wt % to about 53 wt % of a first impact modifier, and from about 1 wt % to about 7 wt % of a second impact modifier; wherein the composition exhibits an adhesion value at least about 10% greater than that of a reference composition consisting essentially of substantially the same proportions of the same polycarbonate polymer and the same first impact modifier.

Other advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate exemplary embodiments and together with the description, serve to explain the principles of the compositions, methods and systems disclosed herein.

DETAILED DESCRIPTION OF THE INVENTION

Figure 1:
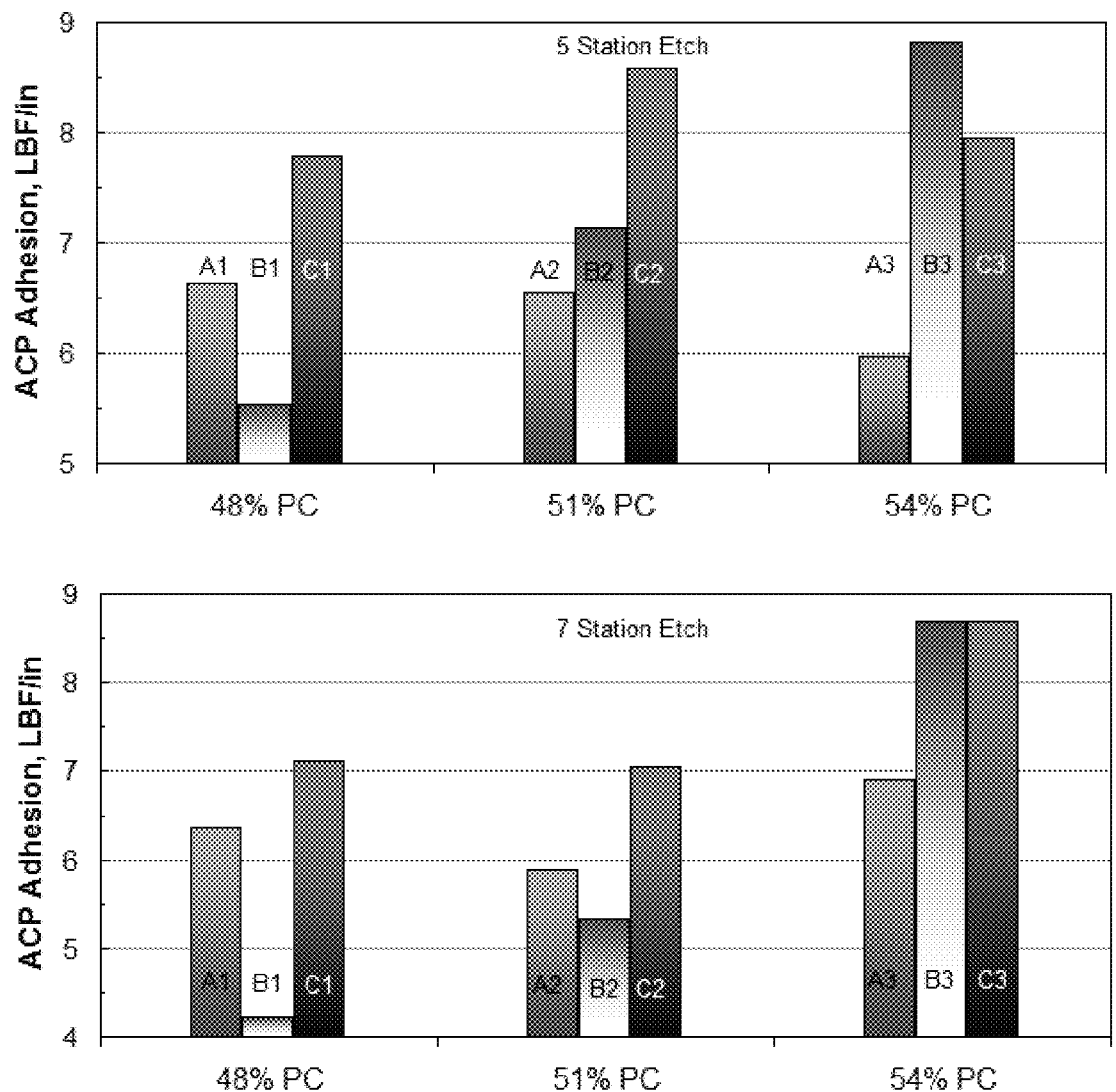
FIG. 1 is a chart illustration of ACP plaque adhesion values for the various blend compositions evaluated in the appended examples.

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. Although any methods and materials similar or equivalent to those described herein can be used in the practice or testing of the present invention, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

All publications mentioned herein are incorporated herein by reference to disclose and describe the methods and/or materials in connection with which the publications are cited.

DEFINITIONS

It is also to be understood that the terminology used herein is for the purpose of describing particular aspects only and is not intended to be limiting. As used in the specification and in the claims, the term "comprising" may include the embodiments "consisting of" and "consisting essentially of" Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a functional group," "an alkyl," or "a residue" includes mixtures of two or more such functional groups, alkyls, or residues, and the like. Furthermore, for example, reference to a filler includes mixtures of fillers.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance can or can not occur, and that the description includes instances where said event or circumstance occurs and instances where it does not. For example, the phrase "optionally substituted alkyl" means that the alkyl group can or can not be substituted and that the description includes both substituted and unsubstituted alkyl groups.

As used herein, the term "effective amount" refers to an amount that is sufficient to achieve the desired modification of a physical property of the composition or material. For example, an "effective amount" of a hydrolytic stabilizer refers to an amount that is sufficient to achieve the desired improvement in hydrolytic stability under applicable test conditions. The specific level in terms of wt % in a composition required as an effective amount will depend upon a variety of factors including the amount and type of hydrolytic stabilizer, amount and type of polycarbonate polymer compositions, amount and type of impact modifier compositions, and end use of the article made using the composition.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included. For example if a particular element or component in a composition or article is said to have 8% weight, it is understood that this percentage is relation to a total compositional percentage of 100%.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

The term "alkyl group" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "alkoxy" as used herein is an alkyl group bound through a single, terminal ether linkage; that is, an "alkoxy" group can be defined as —OR where R is alkyl as defined above. A "lower alkoxy" group is an alkoxy group containing from one to six carbon atoms.

The term "alkenyl group" as used herein is a hydrocarbon group of from 2 to 24 carbon atoms and structural formula containing at least one carbon-carbon double bond. Asymmetric structures such as (AB)C=C(CD) are intended to include both the E and Z isomers. This can be presumed in structural formulae herein wherein an asymmetric alkene is present, or it can be explicitly indicated by the bond symbol C.

The term "alkynyl group" as used herein is a hydrocarbon group of 2 to 24 carbon atoms and a structural formula containing at least one carbon-carbon triple bond.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "cycloalkyl group" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl group" is a cycloalkyl group as defined above where at least one of the carbon atoms of the ring is substituted with a heteroatom such as, but not limited to, nitrogen, oxygen, sulphur, or phosphorus.

The term "aralkyl" as used herein is an aryl group having an alkyl, alkynyl, or alkenyl group as defined above attached to the aromatic group. An example of an aralkyl group is a benzyl group.

The term "hydroxyalkyl group" as used herein is an alkyl, alkenyl, alkynyl, aryl, aralkyl, cycloalkyl, halogenated alkyl, or heterocycloalkyl group described above that has at least one hydrogen atom substituted with a hydroxyl group.

The term "alkoxyalkyl group" is defined as an alkyl, alkenyl, alkynyl, aryl, aralkyl, cycloalkyl, halogenated alkyl, or heterocycloalkyl group described above that has at least one hydrogen atom substituted with an alkoxy group described above.

The term "ester" as used herein is represented by the formula —C(O)OA, where A can be an alkyl, halogenated alkyl, alkenyl, alkynyl, aryl, heteroaryl, cycloalkyl, cycloalkenyl, heterocycloalkyl, or heterocycloalkenyl group described above.

The term "carbonate group" as used herein is represented by the formula —OC(O)OR, where R can be hydrogen, an alkyl, alkenyl, alkynyl, aryl, aralkyl, cycloalkyl, halogenated alkyl, or heterocycloalkyl group described above.

The term "carboxylic acid" as used herein is represented by the formula —C(O)OH.

The term "aldehyde" as used herein is represented by the formula —C(O)H.

The term "keto group" as used herein is represented by the formula —C(O)R, where R is an alkyl, alkenyl, alkynyl, aryl, aralkyl, cycloalkyl, halogenated alkyl, or heterocycloalkyl group described above.

The term "carbonyl group" as used herein is represented by the formula C=O.

The term "ether" as used herein is represented by the formula AOA$^1$, where A and A$^1$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "sulfo-oxo group" as used herein is represented by the formulas —S(O)$_2$R, —OS(O)$_2$R, or, —OS(O)$_2$OR, where R can be hydrogen, an alkyl, alkenyl, alkynyl, aryl, aralkyl, cycloalkyl, halogenated alkyl, or heterocycloalkyl group described above.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

Thermoplastic Compositions

As summarized above, the present disclosure provides improved thermoplastic comprising thermoplastic polycarbonate acrylonitrile-butadiene-styrene (PC/ABS) blends. According to various embodiments, the improved blends are capable of exhibiting improved electroplate adhesion values when evaluated or tested according to conventional testing methods. In additional embodiments, the disclosed thermoplastic compositions can comprise a relatively higher amount of polycarbonate component compared to conventional PC/ABS blends while still maintaining a desired electroplate adhesion value.

The disclosed thermoplastic compositions generally comprise a polycarbonate component, a primary impact modifier component comprising an acrylonitrile-butadiene-styrene polymer, and at least one additional secondary impact modifier chemically different from the first acrylonitrile-butadiene-styrene component. The blends can optionally comprise one or more additives as further detailed below. According to aspects of the invention, the disclosed thermoplastic compositions exhibit an electroplate adhesion value that is greater than the electroplate adhesion value of a corresponding reference blend composition, wherein the reference blend comprises the same polycarbonate component in the same relative amount, wherein the reference blend comprises the same primary impact modifier in an amount equal to the combined total of the primary and secondary impact modifiers present in the disclosed blend, and wherein the reference blend does not comprise a secondary impact modifier. Depending upon the particular formulation, the disclosed thermoplastic compositions according to these aspects can exhibit varying levels of increased electroplate adhesion. For example, and without limitation, in some aspects the electroplate adhesion values can be at least 5% greater, at least 7% greater, at least 10% greater, at least 13% greater, at least 15% greater, at least 17% greater, at least 20% greater, at least 23% greater, at least 25% greater, at least 27% greater, at least 30% greater, at least 33% greater, at least 35% greater, at least 37% greater, or even at least 40% greater than that of the reference blend.

In still further aspects, the disclosed thermoplastic compositions comprise an amount of polycarbonate component that is greater than the amount of polycarbonate component in a corresponding reference blend while still exhibiting an electroplate adhesion value that is equal to or greater than the electroplate adhesion value of the reference blend. According to these aspects, the reference blend comprises the same polycarbonate component and the same primary impact modifier but does not comprise a secondary impact modifier. By incorporation of the secondary impact modifier, the disclosed thermoplastic compositions can comprise an increased relative amount of polycarbonate component while still exhibiting an increased electroplate adhesion value. For example, and without limitation, the disclosed thermoplastic compositions can comprise at least 2% more, at least 4% more, at least 6% more, at least 8% more, or even at least 10% more polycarbonate component than a corresponding reference blend. Still further, as described above and depending again upon the particular formulation, the disclosed thermoplastic compositions according to these aspects can exhibit varying levels of increased electroplate adhesion relative to the reference blend. For example, and without limitation, in some aspects the electroplate adhesion values can be at least 5% greater, at least 7% greater, at least 10% greater, at least 13% greater, at least 15% greater, at least 17% greater, at least 20% greater, at least 23% greater, at least 25% greater, at least 27% greater, at least 30% greater, at least 33% greater, at least 35% greater, at least 37% greater, or even at least 40% greater than that of the reference blend.

In various aspect, the present invention pertains to a thermoplastic composition with improved electroplate adhesion comprising from about 40 wt % to about 69 wt % of one or more polycarbonate resins, from about 30 wt % to about 53 wt % of a first impact modifier, and from about 1 wt % to about 7 wt % of a second impact modifier; wherein the composition exhibits an adhesion value at least about 10% greater than that of a reference composition consisting essentially of substantially the same proportions of the same polycarbonate polymer and the same first impact modifier.

In various aspect, the present invention pertains to a thermoplastic composition with improved electroplate adhesion comprising from about 40 wt % to about 75 wt % of one or more polycarbonate resins, from about 24 wt % to about 53 wt % of a first impact modifier, and from about 1 wt % to about 7 wt % of a second impact modifier; wherein the composition exhibits an adhesion value at least about 10% greater than that of a reference composition consisting essentially of substantially the same proportions of the same polycarbonate polymer and the same first impact modifier.

In various aspect, the present invention pertains to a thermoplastic composition with improved electroplate adhesion comprising from about 50 wt % to about 70 wt % of one or more polycarbonate resins, from about 30 wt % to about 53 wt % of a first impact modifier, and from about 1 wt % to about 7 wt % of a second impact modifier; wherein the composition exhibits an adhesion value at least about 10% greater than that of a reference composition consisting essentially of substantially the same proportions of the same polycarbonate polymer and the same first impact modifier.

In various aspect, the present invention pertains to a thermoplastic composition with improved electroplate adhesion comprising from about 45 wt % to about 68 wt % of one or more polycarbonate resins, from about 31 wt % to about 48 wt % of a first impact modifier, and from about 1 wt % to about 7 wt % of a second impact modifier; wherein the composition exhibits an adhesion value at least about 10% greater than that of a reference composition consisting essentially of substantially the same proportions of the same polycarbonate polymer and the same first impact modifier.

In various aspect, the present invention pertains to a thermoplastic composition with improved electroplate adhesion comprising from about 45 wt % to about 55 wt % of one or more polycarbonate resins, from about 30 wt % to about 53 wt % of a first impact modifier, and from about 1 wt % to about 7 wt % of a second impact modifier; wherein the composition exhibits an adhesion value at least about 10% greater than that of a reference composition consisting essentially of substantially the same proportions of the same polycarbonate polymer and the same first impact modifier.

In various aspect, the present invention pertains to a thermoplastic composition with improved electroplate adhesion comprising from about 45 wt % to about 58 wt % of one or more polycarbonate resins, from about 39 wt % to about 45 wt % of a first impact modifier, and from about 1 wt % to about 7 wt % of a second impact modifier; wherein the composition exhibits an adhesion value at least about 10% greater than that of a reference composition consisting essentially of substantially the same proportions of the same polycarbonate polymer and the same first impact modifier.

In a further aspect, the polycarbonate resin is present in an amount from about 45 wt % to about 55 wt %. In a still further aspect, the polycarbonate resin is present in an amount from about 40 wt % to about 48 wt %. In a yet further aspect, the polycarbonate resin is present in an amount from about 40 wt % to about 69 wt %. In an even further aspect, the polycarbonate resin is present in an amount from about 45 wt % to about 75 wt %. In a still further aspect, the polycarbonate resin is present in an amount from about 50 wt % to about 70 wt %.

In a further aspect, the first impact modifier is present in an amount from about 40 wt % to about 48 wt %. In a still further aspect, the first impact modifier is present in an amount of about 41 wt %.

In a further aspect, the first impact modifier is an acrylonitrile butadiene styrene terpolymer. In a yet further aspect, the first impact modifier consists of a polybutadiene core with grafted styrene acrylonitrile (SAN) copolymer. In a yet further aspect, the first impact modifier consists of a styrene butadiene rubber core (SBR) core with grafted styrene acrylonitrile (SAN) copolymer. In an even further aspect, the first impact modifier is an acrylonitrile butadiene styrene terpolymer with a butadiene content of about 45% to about 65%. In an even further aspect, the first impact modifier is an acrylonitrile butadiene styrene terpolymer with a butadiene content of about 25% to about 55%.

In a further aspect, the second impact modifier is present in an amount from about 3 wt % to about 6 wt %. In a yet further aspect, the second impact modifier is present in an amount of about 5 wt %.

In a still further aspect, the second impact modifier is an acrylonitrile butadiene styrene terpolymer. In a yet further aspect, the acrylonitrile butadiene styrene terpolymer has a butadiene content of about 40% to about 65%. In a still further aspect, the second impact modifier is an acrylonitrile butadiene styrene terpolymer with a butadiene content of about 25% to about 65%.

In a further aspect, the second impact modifier is a methacrylate butadiene styrene (MBS) impact modifier. In a still further aspect, the second impact modifier is MBS with a butadiene content from 70% to 82%. In a yet further aspect, the second impact modifier is MBS with a butadiene content from 70% to 78%.

In a further aspect, the second impact modifier is a methacrylate butadiene (MB) impact modifier. In a still further aspect, the second impact modifier is MB with a butadiene content from 70% to 82%. In a yet further aspect, the second impact modifier is MB with a butadiene content from 70% to 78%.

In a further aspect, the second impact modifier is emulsion polymerized ABS.

In a further aspect, the first impact modifier is an acrylonitrile butadiene styrene terpolymer; and the second impact modifier is an acrylonitrile butadiene styrene terpolymer different than the first impact modifier.

In a further aspect, the first impact modifier is an acrylonitrile butadiene styrene terpolymer; and the second impact modifier is a methacrylate butadiene styrene.

In a further aspect, the composition exhibits an adhesion value at least about 20% greater than that of a reference composition. In a still further aspect, the composition exhibits an adhesion value at least about 30% greater than that of a reference composition. In a yet further aspect, the composition exhibits an adhesion value at least about 40% greater than that of a reference composition. In an even further aspect, the composition exhibits an adhesion value of greater than or equal to about 6 lbs/in. In a still further aspect, the composition exhibits an adhesion value of greater than or equal to about 8 lbs/in.

In a further aspect, the composition further comprises one or more of a primary and second heat stabilizer, UV stabilizer, anti-oxidant, mold release agent, lubricant, flame retardant agent, smoke suppressor agent, buffer, acid scavenger, or hydrolytic stabilizer. In a still further aspect, the anti-oxidant is selected from hindered phenols, organic phosphites, organic phosphonites, thioesters, and any mixture thereof. In a yet further aspect, the acid scavenger is DHT-4C.

In various aspects, the present invention pertains an article comprising a disclosed composition. In a still further aspect, the article is used in automotive applications. In an even further aspect, the article is selected from instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards. In a yet further aspect, the article is selected from seats, seat backs, cargo floors, door panels, steering wheels, radio speaker grilles, instrument panel bezels, steering columns, drip rails, energy absorbers, kick panels, mirror housings, grille opening reinforcements, steps, hatch covers, knobs, buttons, and levers. In an even further aspect, the article is selected from seats, seat backs, cargo floors, door panels, steering wheels, radio speaker grilles, instrument panel bezels, steering columns, drip rails, energy absorbers, kick panels, mirror housings, grille opening reinforcements, steps, hatch covers, knobs, buttons, and levers. In an even further aspect, article is selected from instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, running boards, seats, seat backs, cargo floors, door panels, steering wheels, radio speaker grilles, instrument panel bezels, steering columns, drip rails, energy absorbers, kick panels, mirror housings, grille opening reinforcements, steps, hatch covers, knobs, buttons, and levers.

In a further aspect, the article exhibits an adhesion value of greater than or equal to about 6 lbs/in. In a still further aspect, the article exhibits an adhesion value of greater than or equal to about 8 lbs/in.

In various aspects, the present invention pertains to a process to improve the electroplate adhesion of a thermoplastic composition, the process comprising combining at least one polycarbonate resin, a first impact modifier, and a second impact modifier; wherein at least one polycarbonate resin is combined in an amount of from about 40 wt % to about 55 wt % of the total composition; wherein the first impact modifier is combined in an amount of from about 40 wt % to about 48 wt %; wherein the second impact modifier is combined in an amount of from about 1 wt % to about 7 wt %; and wherein the composition exhibits an adhesion value at least about 10% greater than that of a reference composition consisting essentially of substantially the same proportions of the same polycarbonate polymer and the same first impact modifier.

In a further aspect, the process provides a thermoplastic composition that exhibits an adhesion value at least about 20% greater than that of a reference thermoplastic composition. In a still further aspect, the process provides a composition that exhibits an adhesion value at least about 30% greater than that of a reference composition. In an yet further aspect, the process provides a composition that exhibits an adhesion value at least about 40% greater than that of a reference composition.

Polycarbonate Component

According to various aspects, the polycarbonate component can be present in the disclosed thermoplastic compositions in any desired amount. According to some aspects, the polycarbonate component can be present in amounts ranging from about 40 wt. % to about 69 wt. % of the total blend composition, including for example, about 40, 45, 50, 55, 60, or 65 wt. % of the inventive composition. In another aspect, the polycarbonate component can comprise from about 40 wt. % to about 60 wt. %, including for example, about 42, 44, 46, 48, 50, 52, 54, 56, or 58 wt. % of the inventive composition. In an even further aspect, the polycarbonate component can comprise about 54 wt. % of the disclosed polycarbonate blend.

As used herein, the term polycarbonate is not intended to refer to a specific polycarbonate or group of polycarbonates but rather refers to the any one of the class of compounds containing a repeating chain of carbonate groups. In one aspect, a polycarbonate can comprise any polycarbonate material or mixture of materials as recited in U.S. Pat. No. 7,786,246, which is hereby incorporated in its entirety for the specific purpose of disclosing various polycarbonate compositions and methods. In one aspect, a polycarbonate, as disclosed herein, can be an aliphatic-diol based polycarbonate. In another aspect, a polycarbonate can comprise a carbonate unit derived from a dihydroxy compound, such as for example a bisphenol that differs from the aliphatic diol. In still further aspects, exemplary polycarbonates include aromatic polycarbonates conventionally manufactured through a transesterification reaction of an one or more aromatic dihydroxy compound(s) and a carbonic acid diester in the presence of one or more catalyst(s).

In one aspect, non-limiting examples of suitable bisphenol compounds include the following: 4,4'-dihydroxybiphenyl, 1,6-dihydroxynaphthalene, 2,6-dihydroxynaphthalene, bis (4-hydroxyphenyl)methane, bis(4-hydroxyphenyl)diphenylmethane, bis(4-hydroxyphenyl)-1-naphthylmethane, 1,2-bis (4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4- hydroxy-3-bromophenyl)propane, 1,1-bis(hydroxyphenyl) cyclopentane, 1,1-bis(4-hydroxyphenyl)cyclohexane, 1,1-bis(4-hydroxy-3 methylphenyl)cyclohexane 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2, 2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

In another aspect, exemplary bisphenol compounds can comprise 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)$_n$-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine ("PPPBP"), and 9,9-bis(4-hydroxyphenyl)fluorene. Combinations comprising at least one dihydroxy aromatic compound can also be used. In another aspect, other types of diols can be present in the polycarbonate.

In yet another aspect, polycarbonates with branching groups are can be useful, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl) alpha,alpha-dimethylbenzyl)phenol), 4-chloroformyl phthalic anhydride, trimesic acid, and benzophenone tetracarboxylic acid. In one aspect, a branching agent can be added at a level of about 0.05 to about 2.0 wt %. In still another aspect, mixtures comprising linear polycarbonates and branched polycarbonates can be used.

Polycarbonates can comprise copolymers comprising carbonate units and other types of polymer units, including ester units, and combinations comprising at least one of homopolycarbonates and copolycarbonates. An exemplary polycarbonate copolymer of this type is a polyester carbonate, also known as a polyester-polycarbonate. Such copolymers further contain carbonate units derived from oligomeric ester-containing dihydroxy compounds (also referred to herein as hydroxy end-capped oligomeric acrylate esters). In another aspect, the polycarbonate component does not comprise a separate polymer such as a polyester.

In one aspect, an aliphatic-based polycarbonate comprises aliphatic units that are either aliphatic carbonate units derived from aliphatic diols, or a combination of aliphatic ester units derived from aliphatic diacids having greater than 13 carbons.

In one aspect, the molecular weight of any particular polycarbonate can be determined by, for example, gel permeation chromatography using universal calibration methods based on polystyrene (PS) standards. Generally polycarbonates can have a weight average molecular weight (Mw), of greater than about 5,000 g/mol based on PS standards. In one aspect, the polycarbonates can have an Mw of greater than or equal to about 39,000 g/mol, based on PS standards. In another aspect, the polycarbonates have an Mw based on PS standards of 39,000 to 100,000 g/mol, specifically 40,000 to 90,000 g/mol, more specifically 40,000 to 80,000 g/mol, and still more specifically 40,000 to 70,000 g/mol. In another aspect, the polycarbonates have an Mw based on polycarbonate (PC) standards of 20,000 to 70,000 g/mol, specifically 21,000 to 65,000 g/mol, more specifically 22,000 to 60,000 g/mol, and still more specifically 25,000 to 60,000 g/mol.

Molecular weight (Mw and Mn) as described herein, and polydispersity as calculated therefrom, can be determined using gel permeation chromatography (GPC), using a crosslinked styrene-divinylbenzene column, and either PS or PC standards as specified. GPC samples can be prepared in a solvent such as methylene chloride or chloroform at a concentration of about 1 mg/ml, and can be eluted at a flow rate of about 0.2 to 1.0 ml/min.

In one aspect, the glass transition temperature ($T_g$) of a polycarbonate can be less than or equal to about 160° C., less than or equal to about 150° C., less than or equal to about 145° C., less than or equal to about 140° C., or less than or equal to about 135° C., In a further aspect, the glass transition temperature of a polycarbonate can be from about 85° C. to about 160° C., from about 90° C. to about 160° C., from about 90° C. to about 150° C., or from about 90° C. to about 145° C. In a still further aspect, the glass transition temperature of a polycarbonate can be from about 85° C. to about 130° C., from about 90° C. to about 130° C., from about 90° C. to about 125° C., or from about 90° C. to about 120° C.

In one aspect, polycarbonates can be manufactured using an interfacial phase transfer process or melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium such as for example methylene chloride, and contacting the reactants with a carbonate precursor (such as phosgene) in the presence of a catalyst such as, for example, triethylamine or a phase transfer catalyst salt, under controlled pH conditions of, for example, about 8 to about 10.

The polycarbonate can, in various aspects, be prepared by a melt polymerization process. Generally, in the melt polymerization process, polycarbonates are prepared by co-reacting, in a molten state, the dihydroxy reactant(s) and a diaryl carbonate ester, such as diphenyl carbonate, or more specifically in an aspect, an activated carbonate such as bis(methyl salicyl)carbonate, in the presence of a transesterification catalyst. The reaction can be carried out in typical polymerization equipment, such as one or more continuously stirred reactors (CSTRs), plug flow reactors, wire wetting fall polymerizers, free fall polymerizers, wiped film polymerizers, BANBURY® mixers, single or twin screw extruders, or combinations of the foregoing. In one aspect, volatile monohydric phenol can be removed from the molten reactants by distillation and the polymer is isolated as a molten residue. In another aspect, a useful melt process for making polycarbonates utilizes a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl)carboxylate, bis(4-acetylphenyl)carboxylate, or a combination comprising at least one of the foregoing.

The melt polymerization can include a transesterification catalyst comprising a first catalyst, also referred to herein as an alpha catalyst, comprising a metal cation and an anion. In one aspect, the cation is an alkali or alkaline earth metal comprising Li, Na, K, Cs, Rb, Mg, Ca, Ba, Sr, or a combination comprising at least one of the foregoing. The anion is hydroxide (OH), superoxide ($O^2$), thiolate (HS), sulfide ($S^2$), a $C_{1-20}$ alkoxide, a $C_{6-20}$ aryloxide, a $C_{1-20}$ carboxylate, a phosphate including biphosphate, a $C_{1-20}$ phosphonate, a sulfate including bisulfate, sulfites including bisulfites and metabisulfites, a $C_{1-20}$ sulfonate, a carbonate including bicarbonate, or a combination comprising at least one of the foregoing.

In another aspect, salts of an organic acid comprising both alkaline earth metal ions and alkali metal ions can also be used. Salts of organic acids useful as catalysts are illustrated by alkali metal and alkaline earth metal salts of formic acid, acetic acid, stearic acid and ethyelenediamine tetraacetic acid. The catalyst can also comprise the salt of a non-volatile inorganic acid. By "nonvolatile", it is meant that the referenced compounds have no appreciable vapor pressure at ambient temperature and pressure. In particular, these compounds are not volatile at temperatures at which melt polymerizations of polycarbonate are typically conducted. The salts of nonvolatile acids are alkali metal salts of phosphites; alkaline earth metal salts of phosphites; alkali metal salts of phosphates; and alkaline earth metal salts of phosphates. Exemplary transesterification catalysts include, lithium hydroxide, sodium hydroxide, potassium hydroxide, cesium hydroxide, magnesium hydroxide, calcium hydroxide, barium hydroxide, lithium formate, sodium formate, potassium formate, cesium formate, lithium acetate, sodium acetate, potassium acetate, lithium carbonate, sodium carbonate, potassium carbonate, lithium methoxide, sodium methoxide, potassium methoxide, lithium ethoxide, sodium ethoxide, potassium ethoxide, lithium phenoxide, sodium phenoxide, potassium phenoxide, sodium sulfate, potassium sulfate, $NaH_2PO_3$, $NaH_2PO_4$, $Na_2H_2PO_3$, $KH_2PO_4$, $CsH_2PO_4$, $Cs_2H_2PO_4$, $Na_2SO_3$, $Na_2S_2O_5$, sodium mesylate, potassium mesylate, sodium tosylate, potassium tosylate, magnesium disodium ethylenediamine tetraacetate (EDTA magnesium disodium salt), or a combination comprising at least one of the foregoing. It will be understood that the foregoing list is exemplary and should not be considered as limited thereto. In one aspect, the transesterification catalyst is an alpha catalyst comprising an alkali or alkaline earth salt. In an exemplary aspect, the transesterification catalyst comprising sodium hydroxide, potassium hydroxide, sodium carbonate, potassium carbonate, sodium methoxide, potassium methoxide, $NaH_2PO_4$, or a combination comprising at least one of the foregoing.

The amount of alpha catalyst can vary widely according to the conditions of the melt polymerization, and can be about 0.001 to about 500 μmol. In an aspect, the amount of alpha catalyst can be about 0.01 to about 20 μmol, specifically about 0.1 to about 10 μmol, more specifically about 0.5 to about 9 μmol, and still more specifically about 1 to about 7 μmol, per mole of aliphatic diol and any other dihydroxy compound present in the melt polymerization.

In another aspect, a second transesterification catalyst, also referred to herein as a beta catalyst, can optionally be included in the melt polymerization process, provided that the inclusion of such a second transesterification catalyst does not significantly adversely affect the desirable properties of the polycarbonate. Exemplary transesterification catalysts can further include a combination of a phase transfer catalyst of formula $(R^3)_4Q^+X$ above, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalyst salts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cr, Br, a $C_{1-8}$ alkoxy group or a $C_{6-18}$ aryloxy group. Examples of such transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing. Other melt transesterification catalysts include alkaline earth metal salts or alkali metal salts. In various aspects, where a beta catalyst is desired, the beta catalyst can be present in a molar ratio, relative to the alpha catalyst, of less than or equal to 10, specifically less than or equal to 5, more specifically less than or equal to 1, and still more specifically less than or equal to 0.5. In other aspects, the melt polymerization reaction disclosed herein uses only an alpha catalyst as described hereinabove, and is substantially free of any beta catalyst. As defined herein, "substantially free of" can mean where the beta catalyst has been excluded from the melt polymerization reaction. In one aspect, the beta catalyst is present in an amount of less than about 10 ppm, specifically less than 1 ppm, more specifically less than about 0.1 ppm, more specifically less than or equal to about 0.01 ppm, and more specifically less than or equal to about 0.001 ppm, based on the total weight of all components used in the melt polymerization reaction.

In one aspect, a melt process employing an activated carbonate is utilized. As used herein, the term "activated carbonate", is defined as a diarylcarbonate that is more reactive than diphenylcarbonate in transesterification reactions. Specific non-limiting examples of activated carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl)carbonate, bis(o-formylphenyl)carbonate.

Examples of specific ester-substituted diarylcarbonates include, but are not limited to, bis(methylsalicyl)carbonate (CAS Registry No. 82091-12-1) (also known as BMSC or bis(o-methoxycarbonylphenyl)carbonate), bis(ethylsalicyl)carbonate, bis(propylsalicyl)carbonate, bis(butylsalicyl)carbonate, bis(benzylsalicyl)carbonate, bis(methyl-4-chlorosalicyl)carbonate and the like. In one aspect, bis(methylsalicyl)carbonate is used as the activated carbonate in melt polycarbonate synthesis due to its lower molecular weight and higher vapor pressure.

Some non-limiting examples of non-activating groups which, when present in an ortho position, would not be expected to result in activated carbonates are alkyl, cycloalkyl or cyano groups. Some specific and non-limiting examples of non-activated carbonates are bis(o-methylphenyl)carbonate, bis(p-cumylphenyl)carbonate, bis(p-(1,1,3,3-tetramethyl) butylphenyl)carbonate and bis(o-cyanophenyl)carbonate. Unsymmetrical combinations of these structures can also be used as non-activated carbonates.

In one aspect, an end-capping agent (also referred to as a chain-stopper) can optionally be used to limit molecular weight growth rate, and so control molecular weight in the polycarbonate. Exemplary chain-stoppers include certain monophenolic compounds (i.e., phenyl compounds having a single free hydroxy group), monocarboxylic acid chlorides, and/or monochloroformates. Phenolic chain-stoppers are exemplified by phenol and $C_1$-$C_{22}$ alkyl-substituted phenols such as p-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms can be specifically mentioned. Certain monophenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

In another aspect, endgroups can be derived from the carbonyl source (i.e., the diaryl carbonate), from selection of monomer ratios, incomplete polymerization, chain scission, and the like, as well as any added end-capping groups, and can include derivatizable functional groups such as hydroxy groups, carboxylic acid groups, or the like. In one aspect, the endgroup of a polycarbonate can comprise a structural unit derived from a diaryl carbonate, where the structural unit can be an endgroup. In a further aspect, the endgroup is derived from an activated carbonate. Such endgroups can be derived from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester endgroups. In another aspect, the ester endgroup derived from a salicylic ester can be a residue of BMSC or other substituted or unsubstituted bis(alkyl salicyl)carbonate such as bis(ethyl salicyl)carbonate, bis(propyl salicyl)carbonate, bis(phenyl salicyl)carbonate, bis(benzyl salicyl)carbonate, or the like.

In one aspect, where a combination of alpha and beta catalysts are used in the melt polymerization, a polycarbonate polymer prepared from an activated carbonate can comprise endgroups in an amount of less than 2,000 ppm, less than 1,500 ppm, or less than 1,000 ppm, based on the weight of the polycarbonate. In another aspect, where only an alpha catalyst is used in the melt polymerization, a polycarbonate polymer prepared from an activated carbonate can comprise endgroups in an amount of less than or equal to 500 ppm, less than or equal to 400 ppm, less than or equal to 300 ppm, or less than or equal to 200 ppm, based on the weight of the polycarbonate.

In one aspect, the reactants for the polymerization reaction using an activated aromatic carbonate can be charged into a reactor either in the solid form or in the molten form. Initial charging of reactants into a reactor and subsequent mixing of these materials under reactive conditions for polymerization can be conducted in an inert gas atmosphere such as a nitrogen atmosphere. The charging of one or more reactants can also be done at a later stage of the polymerization reaction. Mixing of the reaction mixture is accomplished by any methods known in the art, such as by stirring. Reactive conditions include time, temperature, pressure and other factors that affect polymerization of the reactants. Typically the activated aromatic carbonate is added at a mole ratio of 0.8 to 1.3, and more preferably 0.9 to 1.3, and all subranges there between, relative to the total moles of monomer unit compounds (i.e., aromatic dihydroxy compound, and aliphatic diacid or diol). In a specific aspect, the molar ratio of activated aromatic carbonate to monomer unit compounds is 1.013 to 1.29, specifically 1.015 to 1.028. In another specific aspect, the activated aromatic carbonate is BMSC.

In one aspect, the melt polymerization reaction can be conducted by subjecting the reaction mixture to a series of temperature-pressure-time protocols. In some aspects, this involves gradually raising the reaction temperature in stages while gradually lowering the pressure in stages. In one aspect, the pressure is reduced from about atmospheric pressure at the start of the reaction to about 1 millibar (100 Pa) or lower, or in another aspect to 0.1 millibar (10 Pa) or lower in several steps as the reaction approaches completion. The temperature can be varied in a stepwise fashion beginning at a temperature of about the melting temperature of the reaction mixture and subsequently increased to final temperature. In one aspect, the reaction mixture is heated from room temperature to about 150° C. In such an aspect, the polymerization reaction starts at a temperature of about 150° C. to about 220° C. In another aspect, the polymerization temperature can be up to about 220° C. In other aspects, the polymerization reaction can then be increased to about 250° C. and then optionally further increased to a temperature of about 320° C., and all subranges there between. In one aspect, the total reaction time can be from about 30 minutes to about 200 minutes and all subranges there between. This procedure will generally ensure that the reactants react to give polycarbonates with the desired molecular weight, glass transition temperature and physical properties. The reaction proceeds to build the polycarbonate chain with production of ester-substituted alcohol by-product such as methyl salicylate. In one aspect, efficient removal of the by-product can be achieved by different techniques such as reducing the pressure. Generally the pressure starts relatively high in the beginning of the reaction and is lowered progressively throughout the reaction and temperature is raised throughout the reaction.

In one aspect, the progress of the reaction can be monitored by measuring the melt viscosity or the weight average molecular weight of the reaction mixture using techniques known in the art such as gel permeation chromatography. These properties can be measured by taking discrete samples or can be measured on-line. After the desired melt viscosity and/or molecular weight is reached, the final polycarbonate product can be isolated from the reactor in a solid or molten form. It will be appreciated by a person skilled in the art, that the method of making aliphatic homopolycarbonate and aliphatic-aromatic copolycarbonates as described in the preceding sections can be made in a batch or a continuous process and the process disclosed herein is preferably carried out in a solvent free mode. Reactors chosen should ideally be selfcleaning and should minimize any "hot spots." However, vented extruders similar to those that are commercially available can be used.

In one aspect, the aliphatic homopolycarbonate and aliphatic-aromatic copolycarbonate can be prepared in an extruder in presence of one or more catalysts, wherein the carbonating agent is an activated aromatic carbonate. In one aspect, the reactants for the polymerization reaction can be fed to the extruder in powder or molten form. In another aspect, the reactants are dry blended prior to addition to the extruder. The extruder can be equipped with pressure reducing devices (e.g., vents), which serve to remove the activated phenol by-product and thus drive the polymerization reaction toward completion. The molecular weight of the polycarbonate product can, in various aspects, be manipulated by controlling, among other factors, the feed rate of the reactants, the type of extruder, the extruder screw design and configuration, the residence time in the extruder, the reaction temperature and the pressure reducing techniques present on the extruder. The molecular weight of the polycarbonate product can also depend upon the structures of the reactants, such as, activated aromatic carbonate, aliphatic diol, dihydroxy aromatic compound, and the catalyst employed. Many different screw designs and extruder configurations are commercially available that use single screws, double screws, vents, back flight and forward flight zones, seals, and sidestreams. One skilled in the art can find the best designs using generally known principals of commercial extruder design. Controlling the ratio diarylcarbonate/diol, specifically BMSC/diol can impact the Mw when using an activated carbonate. A lower ratio can generally give a higher molecular weight.

Primary Impact Modifier

The disclosed thermoplastic compositions further comprise a primary impact modifier component. The primary impact modifier can be a high molecular weight elastomeric material derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. In another aspect, a combination of any two or more individual impact modifiers can be used.

An exemplary type of impact modifier is an elastomer-modified graft copolymer comprising an elastomeric (i.e., rubbery) polymer substrate having a $T_g$ less than about 10° C., less than about −10° C., or about −40° C. to −80° C., and a rigid polymeric superstrate grafted to the elastomeric polymer substrate. Materials suitable for use as the elastomeric phase include, for example, conjugated diene rubbers, for example polybutadiene and polyisoprene; copolymers of a conjugated diene with less than about 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_{1-6}$ esters of acrylic acid and methacrylic acid, specifically poly methyl methacrylate (PMMA), and copolymers of monovinyl aromatic monomers and monovinylic monomers.

Exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

In one aspect, the first impact modifier is preferably an acrylonitrile-butadiene-styrene (ABS) elastomer. Such impact modifiers are commercially available, and one of skill in the art, in possession of this disclosure, could readily select an appropriate impact modifier.

The primary impact modifier can be present in the disclosed thermoplastic compositions in any desired amount. According to some aspects, the primary impact modifier can be present in amounts ranging from about 30 wt. % to about 53 wt. % of the total blend composition, including for example, about 35, 40, 45, 50, or 53 wt. % of the disclosed polycarbonate blend. In another aspect, the primary impact modifer component can comprise from about 40 wt. % to about 50 wt. %, including for example, about 42, 44, 46, 48, or 50 wt. % of the total blend composition. In various aspects, the butadiene content of the primary impact modifier can be present from 25% to 65%, more specifically from 25% to 55%, more specifically from 25% to 45% and more specifically from 30% to 40%. One of skill in the art, in possession of this disclosure, could readily select an appropriate amount of any one or more impact modifiers to use in a polymer composition.

Secondary Impact Modifier

The disclosed thermoplastic compositions further comprise a secondary impact modifier component that is different from the selected primary impact modifier. The secondary impact modifier can again be a high molecular weight elastomeric material derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. In another aspect, a combination of any two or more individual impact modifiers can be used.

An exemplary type of secondary impact modifier is an elastomer-modified graft copolymer comprising an elastomeric (i.e., rubbery) polymer substrate having a $T_g$ less than about 10° C., less than about −10° C., or about −40° C. to −80° C., and a rigid polymeric superstrate grafted to the elastomeric polymer substrate. Materials suitable for use as the elastomeric phase include, for example, conjugated diene rubbers, for example polybutadiene and polyisoprene; copolymers of a conjugated diene with less than about 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_{1-6}$ esters of acrylic acid and methacrylic acid, specifically poly methyl methacrylate (PMMA), and copolymers of monovinyl aromatic monomers and monovinylic monomers.

Exemplary elastomer-modified graft copolymers suitable for use as the secondary impact modifier include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and methyl methacrylate-butadiene (MB).

In one aspect, the secondary impact modifier preferably comprises an elastomer-modified graft copolymer formed from a conjugated diene,1 including for example those impact modifiers comprising a polybutadiene rubber. According to exemplary aspects, the secondary impact modifier comprises an acrylonitrile-butadiene-styrene (ABS) elastomer, a methyl methacrylate-butadiene-styrene (MBS) elastomer, a methyl methacrylate-butadiene (MB) elastomer, or a combination thereof. Such secondary impact modifiers are commercially available, and one of skill in the art, in possession of this disclosure, could readily select an appropriate secondary impact modifier. In various aspects, the butadiene content of the secondary impact modifier can be present from 45% to 82%, more specifically from 40% to 65%, more specifically from 55% to 65%, more specifically from 70% to 78%.

The secondary impact modifier can be present in the disclosed thermoplastic compositions in any desired amount. According to some aspects, the secondary impact modifier can be present in amounts ranging from about 0.5 wt. % to about 7 wt. % of the total blend composition, including for example, about 0.75, 1.0 1.5, 2.0, 2.5, 3.0, 3.5, 4.0, 4.5, 5.0, 5.5, 6.0, 6.5, and 7.0 wt. % of the total blend. In another aspect, the secondary impact modifier component can comprise from about 2 wt. % to about 5 wt. %, including for example, about 2.5, 3.0, 3.5, 4.0, or 4.5 wt. % of the total blend composition. One of skill in the art, in possession of this disclosure, could readily select an appropriate amount of any one or more secondary impact modifiers to use in the disclosed blends.

Hydrolytic Stabilizer

In various aspects, the disclosed thermoplastic compositions with improved electroplate adhesion of the present invention can further comprise a hydrolytic stabilizer, wherein the hydrolytic stabilizer comprises a hydrotalcite and an inorganic buffer salt. In a further aspect, the disclosed blended polycarbonate compositions with improved hydrolytic stability of the present invention comprise a hydrolytic stabilizer, wherein the hydrolytic stabilizer comprises one or more hydrotalcites and an inorganic buffer salt comprising one or more inorganic salts capable of pH buffering.

Hydrotalcite is a synthetic or naturally occurring alumino magnesium carbonate. Synthetic hydrotalcite is preferred for its consistency and low color. The effective amount of hydrotalcite needed to improve hydrolytic stability will depend on the amount and type of emulsion polymer blended with PC. In various aspects, the amount of calcined hydrotalcite will be from about 0.1 to 1 pph based on the whole formulation. In some instances the hydrotalcite may be calcined from 400-1000° C. In a further aspect, the calcined hydrotalcite may have a magnesium oxide to aluminum oxide mole ratio of about 1.0 to 5.0. Calcined hydrotalcite with an average particle size of less than or equal to about 10 microns can be used in some cases to improve impact strength. In other instances, for example when food contact is desired, the calcined hydrotalcite has less than about 30 ppm of elements selected from the group consisting of: mercury, lead, cadmium, arsenic, bismuth and mixtures thereof. In a still further aspect, the hydrotalcite has not been coated or treated with a carboxylic acid, carboxylic acid salt, ammonium salt, alkyl ammonium salt, aryl ammonium salt, polyether surfactant or other wetting agent or surfactant. Without wishing to be bound by a particular theory, these wetting agents and surfactants may catalyze polycarbonate decomposition in a manner analogous to the action of some of the residues of emulsion polymerization.

Either synthetic hydrotalcites or natural hydrotalcites can be used as the hydrotalcite compound in the present invention. Exemplary hydrotalcites which are useful in the compositions of the present are commercially available and include, but are not limited to, magnesium hydrotalcites such as DHT-4C (available from Kyowa Chemical Co.); Hysafe 539 and Hysafe 530 (available from J.M. Huber Corporation). Synthetic hydrotalcites can be produced by the reaction of a carbonate source, a magnesium source, and an aluminum source. U.S. Pat. Nos. 3,539,306; 3,650,704 and 4,351,814 disclose the preparation of synthetic hydrotalcites. U.S. Pat. No. 6,291,570 disclosed a flame retardant resin composition that contains hydrotalcite compound particles. These hydrotalcite compounds may be used either individually or in combinations of two or more. An exemplary hydrotalcite useful in the present invention has the following structurual formula:

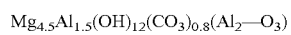

$Mg_{4.5}Al_{1.5}(OH)_{12}(CO_3)_{0.8}(Al_2-O_3)$

In a further aspect, the hydrocalcite is a synthetic hydrotalcite. In a yet further aspect, the hydrocalcite is a natural hydrotalcite. In a still further aspect, the hydrocalcite is a calcined hydrocalcite. In a yet further aspect, the hydrocalcite can be in the form of a powder, particulate, granulate, microparticle, or nanoparticle. In a still further aspect, the hydrocalcite is a particulate with median particle size less than about 500 µm, less than about 400 µm, less than about 300 µm, less than about 200 µm, less than about 100 µm, less than about 50 µm, less than about 25 µm, less than about 10 µm, or less than about 1 µm. In a yet further aspect, the hydrocalcite is a particulate with median particle size less than or equal to about 10 µm. In an even further aspect, the hydrocalcite is a particulate with median particle size of about 10 µm.

In various aspects, the inorganic buffer salt is an inorganic salt that can act as a buffering agent. As used herein, the term "inorganic buffer salt" is intended to include inorganic compounds used to resist a change in pH upon dilution or addition of acid or alkali. In a further aspect, the inorganic salt buffer has a pKa value in aqueous solution of about 5.0 to about 7.0 at about 20° C. In a still further aspect, the inorganic salt buffer has a pKa value in aqueous solution of about 6.0 to about 7.0 at about 20° C. In a yet further aspect, the inorganic salt buffer has a pKa value in aqueous solution of about 6.8 at about 20° C. In a still further aspect, the inorganic buffer salt of the present invention comprises an inorganic buffer salt in the solid state and a inorganic buffer solution.

In one aspect, the inorganic buffer salt is not an nitrogen or amine-containing salt. In an even further aspect, the inorganic buffer salt is essentially free of a nitrogen-containing species. In a still further aspect, the inorganic buffer salt has about ≤1 ppm nitrogen, about ≤5 ppm nitrogen, or about ≤10 ppm nitrogen. In a yet further aspect, the inorganic buffer salt has about ≤1 ppm nitrogen.

Representative inorganic buffer salts of the present invention include, without limitation, potassium dihydrogen orthophosphate, disodium hydrogen orthophosphate, disodium hydrogen orthophosphate, potassium phosphate, potassium phosphate monobasic, potassium phosphate dibasic, sodium phosphate monobasic, sodium phosphate dibasic, and potassium metaphosphate, and other such like materials known in the art, and combinations thereof. Alternatively, the inorganic buffer salt can by a soluble inorganic salts such as the carbonates, bicarbonates, sequiscarbonates, silicates, pyrophosphates, phosphates, orthoborates, tetraborates, and mixtures thereof. In a still further aspect, the inorganic buffer salt can be an alkali metal salts or alkaline earth metal salts of a dibasic and tribasic inorganic acid, optionally in combination with its conjugate acid salt. Thus, examples of materials which can be used either alone or in combination as a buffering inorganic salt herein include sodium carbonate, sodium bicarbonate, sodium sesquicarbonate, sodium silicate, tetrapotassium pyrophosphate, trisodium phosphate, tripotassium phosphate, anhydrous sodium tetraborate, sodium tetraborate pentahydrate and sodium tetraborate decahydrate. In a still further aspect, ammonium salts, alkali metal salts, and alkaline earth metal salts of a dibasic and tribasic inorganic acid, optionally in combination with its conjugate acid salt. The solid inorganic buffer salt can be anhydrous or a hydrate of the salt. Further examples include carbonate or carbonate-bicarbonate (as their sodium and/or potassium salts), phosphate-monohydrogen phosphate or monohydrogen phosphate-dihydrogen phosphate (as their sodium and/or potassium salts), boric acid-borax, or borax-sodium borate, and the like. In a further aspect, the inorganic buffer salt of the present invention preferably includes one or more sodium phosphate compositions, one or more potassium phosphate compositions or combinations thereof.

In one aspect, the inorganic buffer salt comprises a phosphate buffer salt. An exemplary inorganic buffer salt useful in the present invention is a phosphate buffer salt such as an alkali metal or alkaline earth salt of the dihydrogen phosphate and hydrogen phosphate, e.g. the sodium salts (e.g. $NaH_2PO_4$ and $Na_2HPO_4$) or the potassium salts (e.g. $KH_2PO_4$ and $K_2HPO_4$). In a still further aspect, the inorganic buffer salt is a phosphate buffer salt comprising a combination of the mono ($NaH_2PO_4$) and di-sodium phosphate ($Na_2HPO_4$) solutions.

In various aspects, the inorganic buffer salt is a solid. For example, the blended polycarbonate compositions with improved hydrolytic stability can comprise from about 0.01 pph to about 10 pph of a solid inorganic buffer salt. Alternatively, the blended polycarbonate compositions with improved hydrolytic stability can comprise from about 0.1 to about 1 pph of a solid inorganic buffer salt.

In a further aspect, the solid inorganic buffer salt can be in the form of a powder, particulate, granulate, microparticle, or nanoparticle. In a still further aspect, the inorganic buffer salt is a particulate with median particle size less than about 500 µm, less than about 400 µm, less than about 300 µm, less than about 200 µm, less than about 100 µm, less than about 50 µm, less than about 25 µm, less than about 10 µm, or less than about 1 µm. In a yet further aspect, the inorganic buffer salt is a particulate with median particle size less than or equal to about 10 µm. In an even further aspect, the inorganic buffer salt is a particulate with median particle size of about 10 µm.

In one aspect, the inorganic buffer salt comprises an inorganic salt of a phosphorus-containing oxy-acid. In a further aspect, the phosphorus-containing oxy-acid is a multi-protic phosphorus-containing oxy-acid have the general formula:

$M_xH_mP_tO_n$, where x is 1 or greater, m is 0 or greater, n is 2 or greater, and t is 1 or greater. Examples of inorganic salts of multi-protic phosphorus-containing oxy-acids include, but are not limited to, alkali metal or alkaline eart salts of phosphoric acid, phosphorous acid, hypophosphorous acid, hypophosphoric acid, phosphinic acid, phosphonic acid, metaphosphoric acid, hexametaphosphoric acid, thiophosphoric acid, fluorophosphoric acid, difluorophosphoric acid, fluorophosphorous acid, difluorophosphorous acid, fluorohypophosphorous acid, or fluorohypophosphoric acid.

In one aspect, an inorganic buffer solution can be prepared from a combination of dibasic or tribasic acid salts and their conjugate acid salts, such as carbonate-bicarbonate, phosphate-monohydrogen phosphate, monohydrogen phosphate-dihydrogen phosphate, etc. Alternatively, an inorganic buffer solution can be prepared directly from a salt of the dibasic or tribasic acid and a conjugate acid. In various further aspects, an inorganic buffer solution can be formed in solution by partial neutralization of the salt of the dibasic or tribasic acid with another acid, or such as mineral acids like sulfuric acid, phosphoric acid, or boric acid. Conversely, they may also be formed in situ by partial neutralization of the conjugate acid, such as bicarbonate salt, a monohydrogen phosphate salt, borax, etc., with a strong alkali, such as an alkali metal hydroxide or an alkaline earth metal hydroxide. Variations and adjustments of the pH of the inorganic buffer solution can be obtained by moderating the addition of the buffer salt(s).

In a further aspect, the inorganic buffer solution is essentially free of a nitrogen containing species. In a yet further aspect, a nitrogen-containing species is present in an amount less than about 1 ppm nitrogen in the inorganic buffer solution. In a still further aspect, the inorganic buffer solution has about ≤1 ppm nitrogen, about ≤5 ppm nitrogen, or about ≤10 ppm nitrogen. In a yet further aspect, the inorganic buffer salt has about ≤1 ppm nitrogen. In an even further aspect, the nitrogen-containing species is an ammonium salt. In a still further aspect, the nitrogen-containing species is an amine salt.

In one aspect, the inorganic buffer solution comprises a phosphate buffer. In a further aspect, the inorganic buffer solution comprises a phosphorus-containing salt. In a yet further aspect, the phosphorus-containing salt is a phosphate salt. For example, in various aspects, the inorganic buffer solution is prepare using an inorganic salts of weak inorganic acids. An exemplary inorganic buffer useful in the present invention is phosphate buffer solution prepared from the appropriate salts of the dihydrogen phosphate and hydrogen phosphate, e.g. the sodium salts (e.g. $NaH_2PO_4$ and $Na_2HPO_4$) or the potassium salts (e.g. $KH_2PO_4$ and $K_2HPO_4$). In a still further aspect, the inorganic buffer is a phosphate buffer solution prepared using a combination of the mono ($NaH_2PO_4$) and di-sodium phosphate ($Na_2HPO_4$) solutions. In an even further aspect, the phosphate buffer solution comprises phosphate containing salts of sodium, potassium, lithium, cesium, calcium, magnesium, strontium, barium, zince, tin, aluminum, or any combination thereof.

In a further aspect, the inorganic buffer solution used in the disclosed blended polycarbonate composition has a concentration selected from about 0.1 M, about 0.2 M, about 0.3, about 0.4 M, about 0.5 M, about 0.6 M, about 0.7 M, about 0.8 M, about 0.9 M, and about 1.0 M. In a still further aspect, the inorganic buffer solution has a concentration of about 0.5 M. In a yet further aspect, the inorganic buffer solution has a concentration of about 0.25 M to about 1.0 M. In an even further aspect, the inorganic buffer solution has a concentration of about 0.25 M to about 0.75 M. In a still further aspect, the inorganic buffer solution has a concentration of about 0.40 M to about 0.60 M. In a yet further aspect, the inorganic buffer solution has a concentration of about 0.5 M.

In a further aspect, the inorganic buffer solution used in the blended polycarbonate composition has a pH selected from about 6.5, about 6.6, about 6.7, about 6.8, about 6.9, and about 7.0. In a yet further aspect, the inorganic buffer solution has a pH about ≤7.0. In an even further aspect, the inorganic buffer solution has a pH of about 5.0 to about 7.0. In a still further aspect, the organic buffer solution has a pH of about 6.0 to about 7.0. In a yet further aspect, the organic buffer solution has a pH of about 6.8.

In a further aspect, the inorganic buffer solution used in the blended polycarbonate composition is a sodium phosphate buffer solution with a concentration of about 0.5 M and a pH of about 6.8.

In a further aspect, the phosphate buffer solution used in the disclosed blended polycarbonate composition has a concentration selected from about 0.1 M, about 0.2 M, about 0.3, about 0.4 M, about 0.5 M, about 0.6 M, about 0.7 M, about 0.8 M, about 0.9 M, and about 1.0 M. In a still further aspect, the phosphate buffer solution has a concentration of about 0.5 M. In a yet further aspect, the phosphate buffer solution has a concentration of about 0.25 M to about 1.0 M. In an even further aspect, the phosphate buffer solution has a concentration of about 0.25 M to about 0.75 M. In a still further aspect, the phosphate buffer solution has a concentration of about 0.40 M to about 0.60 M. In a yet further aspect, the phosphate buffer solution has a concentration of about 0.5 M.

In a further aspect, the phosphate buffer solution used in the blended polycarbonate composition has a pH selected from about 6.5, about 6.6, about 6.7, about 6.8, about 6.9, and about 7.0. In a yet further aspect, the phosphate buffer solution has a pH about ≤7.0. In an even further aspect, the phosphate buffer solution has a pH of about 5.0 to about 7.0. In a still further aspect, the organic buffer solution has a pH of about 6.0 to about 7.0. In a yet further aspect, the organic buffer solution has a pH of about 6.8.

In various aspects, the invention pertains to a process for preparing thermoplastic compositions comprising a hydrolytic stabilizer with improved electroplate adhesion, wherein the process comprises preparing a desired blend of at least one polycarbonate polymer, a first impact modifier composition, a second impact modifier composition, and adding varying amounts of, as described in the description herein, of hydrolytic stabilizer composition comprising a hydrotalcite and an inorganic buffer salt, melt mixing the ingredients and testing the resultant mixture, or parts molded from it, for improved retention of properties after exposure to moisture. In this manner the optimal amount of hydrolytic stabilizer composition needed to improve property retention after exposure to moisture, compared to similar blends with no hydrolytic stabilizer composition, is determined. The exposure to moisture can take place in various manners, for various times and at various temperatures. For example; the parts may be autoclaved for several cycles, they may be exposed to steam in a pressure cooker, they may be immersed in water or exposed to constant humidity at various temperatures. A useful method is to expose molded parts to a constant relative humidity of 95% at 90° C. for 500 or 1000 hours. Some methods that may be used to determine retention of properties after exposure to moisture are; retention of melt viscosity, retention of impact strength, such as Izod impact and retention of flexural or tensile strength. These tests are well known to those skilled in the art and can be measured by various standardized procedures such as ASTM and ISO methods.

Optional Additives

The disclosed thermoplastic compositions can also optionally comprise one or more additives such as fillers, reinforcing agents, stabilizers, and the like, with the proviso that the additives do not adversely affect the desired properties of the polycarbonate blend compositions. Mixtures of additives may also be used. Such additives may be mixed at a suitable time during the mixing of the components for forming the composition.

Examples of suitable fillers or reinforcing agents include any materials known for these uses. For example, suitable fillers and reinforcing agents include silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly (vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of about zero to about 50 parts by weight, optionally about 1 to about 20 parts by weight, and in some embodiments, about 4 to about 15 parts by weight, based on 100 parts by weight of the blend composition of polycarbonate, primary and secondary impact modifier.

The disclosed thermoplastic compositions may further comprise a primary antioxidant or "stabilizer" (e.g., a hindered phenol and/or secondary aryl amine) and, optionally, a secondary antioxidant (e.g., a phosphate and/or thioester). Suitable antioxidant additives include, for example, organic phosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of paracresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of about 0.01 to about 1 parts by weight, optionally about 0.05 to about 0.5 parts by weight, based on 100 parts by weight of the blend composition of polycarbonate, primary and secondary impact modifier.

Suitable heat stabilizer additives include, for example, organic phosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, organic phosphates such as trimethyl phosphate, thioesters such as pentaerythritol beta-laurylthiopropionate, and the like, or combinations comprising at least one of the foregoing heat stabilizers. Heat stabilizers are generally used in amounts of about 0.01 to about 5 parts by weight, optionally about 0.05 to about 0.3 parts by weight, based on 100 parts by weight of the blend composition of polycarbonate, primary and secondary impact modifier.

Light stabilizers and/or ultraviolet light (UV) absorbing additives may also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of about 0.01 to about 10 parts by weight, optionally about 0.1 to about 1 parts by weight, based on 100 parts by weight of the blend composition of polycarbonate, primary and secondary impact modifier.

Suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenyl-acryloyl)oxy]methyl]propane (UVINUL™ 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenyl-acryloyl)oxy]methyl]propane; nano-size inorganic materials such as titanium oxide, cerium oxide, and zinc oxide, all with particle size less than about 100 nanometers; or the like, or combinations comprising at least one of the foregoing UV absorbers. UV absorbers are generally used in amounts of about 0.1 to about 5 parts by weight, based on 100 parts by weight of the blend composition of polycarbonate, primary and secondary impact modifier.

Plasticizers, lubricants, and/or mold release agents additives may also be used. There is considerable overlap among these types of materials, which include, for example, phthalic acid esters such as dioctyl-4,5-epoxy-hexahydrophthalate; tris(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylenepolypropylene glycol copolymers in a suitable solvent; waxes such as beeswax, montan wax, paraffin wax or the like. Such materials are generally used in amounts of about 0.1 to about 20 parts by weight, optionally about 1 to about 10 parts by weight, based on 100 parts by weight of the blend composition of polycarbonate, primary and secondary impact modifier.

Colorants such as pigment and/or dye additives may also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of about 0.01 to about 10 parts by weight, based on 100 parts by weight of the blend composition of polycarbonate, primary and secondary impact modifier.

Suitable dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3",5"-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or amounts of about 0.1 to about 10 ppm, based on 100 parts by weight of the blend composition of polycarbonate, primary and secondary impact modifier.

Suitable flame retardants that may be added may be organic compounds that include phosphorus, bromine, and/or chlorine. Non-brominated and non-chlorinated phosphorus-containing flame retardants may be desired in certain applications for regulatory reasons, for example organic phosphates and organic compounds containing phosphorus-nitrogen bonds. Halogenated materials may also be used as flame retardants. Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, may also be used with the flame retardant. Inorganic flame retardants may also be used, for example salts of $C_{1-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or a fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like.

Anti-drip agents may also be used, for example a fibril forming or non-fibril forming fluoropolymer such as polytetrafluoroethylene (PTFE). The anti-drip agent may be encapsulated by a rigid copolymer as described above, for example SAN. PTFE encapsulated in SAN is known as TSAN. Encapsulated fluoropolymers may be made by polymerizing the encapsulating polymer in the presence of the fluoropolymer, for example, in an aqueous dispersion. TSAN may provide significant advantages over PTFE, in that TSAN may be more readily dispersed in the composition. A suitable TSAN may comprise, for example, about 50 wt % PTFE and about 50 wt % SAN, based on the total weight of the encapsulated fluoropolymer. The SAN may comprise, for example, about 75 wt % styrene and about 25 wt % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer.

Where a foam is desired, suitable blowing agents include, for example, low boiling halohydrocarbons and those that generate carbon dioxide; blowing agents that are solid at room temperature and when heated to temperatures higher than their decomposition temperature, generate gases such as nitrogen, carbon dioxide or ammonia gas, such as azodicarbonamide, metal salts of azodicarbonamide, 4,4' oxybis(benzenesulfonylhydrazide), sodium bicarbonate, ammonium carbonate, or the like; or combinations comprising at least one of the foregoing blowing agents.

The thermoplastic polycarbonate blend compositions may be manufactured by methods generally available in the art. For example, in one embodiment, in one manner of proceeding, the polycarbonate, primary impact modifier, secondary impact modifier and any other optional components (such as antioxidants, mold release agents, and the like) can be first blended, in a Henschel™ high speed mixer or other suitable mixer/blender. Other low shear processes including but not limited to hand mixing may also accomplish this blending. The blend is then fed into the throat of a twin-screw extruder via a hopper. Alternatively, one or more of the components may be incorporated into the composition by feeding directly into the extruder at the throat and/or downstream through a sidestuffer. Such additives may also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming.

Articles

In various aspects, the disclosed thermoplastic compositions with improved electroplate adhesion of the present invention can be used in making articles. The disclosed blended polycarbonate compositions can be formed into useful shaped articles by a variety of means such as; injection molding, extrusion, rotational molding, compression molding, blow molding, sheet or film extrusion, profile extrusion, gas assist molding, structural foam molding and thermoforming. The thermoplastic compositions with improved electroplate adhesion described herein can also be made into film and sheet as well as components of laminate systems. In a further aspect, a method of manufacturing an article comprises melt blending the hydrolytic stabilizer composition, the polycarbonate polymer composition, the first impact modifier composition, and the second impact modifier components; and molding the extruded composition into an article. In a still further aspect, the extruding is done with a single screw extruder or a twin screw extruder.

Formed articles include, for example, computer and business machine housings, home appliances, trays, plates, handles, helmets, automotive parts such as instrument panels, cup holders, glove boxes, interior coverings and the like. In various further aspects, formed articles include, but are not limited to, food service items, medical devices, animal cages, electrical connectors, enclosures for electrical equipment, electric motor parts, power distribution equipment, communication equipment, computers and the like, including devices that have molded in snap fit connectors. In a further aspect, articles of the present invention comprise exterior body panels and parts for outdoor vehicles and devices including automobiles, protected graphics such as signs, outdoor enclosures such as telecommunication and electrical connection boxes, and construction applications such as roof sections, wall panels and glazing. Multilayer articles made of the disclosed polycarbonates particularly include articles which will be exposed to UV-light, whether natural or artificial, during their lifetimes, and most particularly outdoor articles; i.e., those intended for outdoor use. Suitable articles are exemplified by enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; facsimile machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications.

In one aspect, the present invention pertains to articles comprising the disclosed thermoplastic compositions with improved electroplate adhesion. In a further aspect, the article comprising the disclosed thermoplastic compositions with improved electroplate adhesion is used in automotive applications. In a still further aspect, the article used in automotive applications is selected from instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards. In a yet further aspect, the article used in automotive applications is selected from seats, seat backs, cargo floors, door panels, steering wheels, radio speaker grilles, instrument panel bezels, steering columns, drip rails, energy absorbers, kick panels, mirror housings, grille opening reinforcements, steps, hatch covers, knobs, buttons, and levers. In an even further aspect, the article used in automotive applications is selected from seats, seat backs, cargo floors, door panels, steering wheels, radio speaker grilles, instrument panel bezels, steering columns, drip rails, energy absorbers, kick panels, mirror housings, grille opening reinforcements, steps, hatch covers, knobs, buttons, and levers. In an even further aspect, article is selected from instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, running boards, seats, seat backs, cargo floors, door panels, steering wheels, radio speaker grilles, instrument panel bezels, steering columns, drip rails, energy absorbers, kick panels, mirror housings, grille opening reinforcements, steps, hatch covers, knobs, buttons, and levers.

Shaped, formed, or molded articles comprising the polycarbonate compositions are also provided. The polycarbonate compositions may be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, electronic device casings and signs and the like. In addition, the polycarbonate compositions may be used for such applications as automotive panel and trim. Examples of suitable articles are exemplified by but are not limited to aircraft, automotive, truck, military vehicle (including automotive, aircraft, and water-borne vehicles), scooter, and motorcycle exterior and interior components, including panels, quarter panels, rocker panels, trim, fenders, doors, deck-lids, trunk lids, hoods, bonnets, roofs, bumpers, fascia, grilles, mirror housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings; personal water-craft; jet-skis; pools; spas; hot tubs; steps; step coverings; building and construction applications such as glazing, roofs, windows, floors, decorative window furnishings or treatments; treated glass covers for pictures, paintings, posters, and like display items; wall panels, and doors; counter tops; protected graphics; outdoor and indoor signs; enclosures, housings, panels, and parts for automatic teller machines (ATM); computer; desk-top computer; portable computer; lap-top computer; hand held computer housings; monitor; printer; keyboards; FAX machine; copier; telephone; phone bezels; mobile phone; radio sender; radio receiver; enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; shoe laces; articles made from plastic-wood combinations; golf course markers; utility pit covers; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated painted articles; coated dyed articles; coated fluorescent articles; coated foam articles; and like applications. The invention further contemplates additional fabrication operations on said articles, such as, but not limited to, molding, in-mold decoration, baking in a paint oven, lamination, and/or thermoforming. The articles made from the composition of the present invention may be used widely in automotive industry, home appliances, electrical components, and telecommunications.

As illustrated in the following Examples, the disclosed thermoplastic compositions are especially useful as substrates in the manufacture of electroplated products. Contrary to conventional understanding that increasing the level of polycarbonate in an impact modified polycarbonate blend reduces the corresponding electroplate adhesion value, the disclosed thermoplastic compositions exhibit an increasing electroplate adhesion value as the quantity of polycarbonate present in the blend also increases. Without wishing to be bound by theory, it is believed the incorporation of the secondary impact modifier, such as a second butadiene-containing impact modifier, is responsible for this unexpected and surprising reverse behavior.

Without further elaboration, it is believed that one skilled in the art can, using the description herein, utilize the present invention. The following examples are included to provide addition guidance to those skilled in the art of practicing the claimed invention. The examples provided are merely representative of the work and contribute to the teaching of the present invention. Accordingly, these examples are not intended to limit the invention in any manner.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein may be different from the actual publication dates, which can require independent confirmation.

EXAMPLES

The following examples are put forth so as to provide those of ordinary skill in the art with a complete disclosure and description of how the methods, devices, and systems disclosed and claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in C or is at ambient temperature, and pressure is at or near atmospheric.

The materials shown in Table 1 were used to prepare the compositions described herein. Batches were prepared of the formulations shown in Table 2. Sample batches (40 LBS) were prepared by pre-blending all constituents in a dry-blend and tumble mixing for 20 minutes. The pre-blend was fed directly to a co-rotating twin screw extruder (30 mm) operated under standard processing conditions well know to one skilled in the art.

TABLE 1

| Abbreviation | Description | Source |
|---|---|---|
| PC1 | BPA polycarbonate resin made by an interfacial process with a weight average molecular weight of about 30,000 on an absolute PC molecular weight scale. | SABIC Innovative Plastics ("SABIC-IP") |
| PC2 | BPA polycarbonate resin made by an interfacial process with a weight average molecular weight of about 22,000 on an absolute PC molecular weight scale. | SABIC-IP |
| ABS1 | Emulsion polymerized acrylonitrile butadiene styrene with styrene acrylonitrile grafts on butadiene core, nominal butadiene content of 31.6 wt. % and acrylonitrile content of 21 wt. %. | SABIC-IP |
| ABS2 | Acrylonitrile butadiene styrene impact modifier. (Trade name HR 181). | Kumho Petrochemical Co., Ltd. |
| ABS3 | Emulsion polymerized acrylonitrile butadiene styrene with styrene acrylonitrile grafts on butadiene core, nominal butadiene content of 61.2 wt. % and acrylonitrile content of 8.7 wt. %. | SABIC-IP |
| ABS4 | Emulsion polymerized acrylonitrile butadiene styrene with styrene acrylonitrile grafts on butadiene core, nominal butadiene content of 50.4 wt. % and acrylonitrile content of 10.5 wt. %. | SABIC-IP |
| ABS5 | Emulsion polymerized acrylonitrile butadiene styrene with styrene acrylonitrile grafts on butadiene core, nominal butadiene content of 50.4 wt. % and acrylonitrile content of 11.1 wt. %. | SABIC-IP |

TABLE 1-continued

| Abbreviation | Description | Source |
|---|---|---|
| MBS | Nominal 80-82 wt. % butadiene core with a balance of styrene-methyl methacrylate shell. Trade name: EXL 2691A. | Dow Chemical |
| BABS | Bulk Acrylonitrile Butadiene Styrene with nominal 16% butadiene content and nominal 15% acrylonitrile content, phase inverted with occluded SAN in a butadiene phase in SAN matrix. | SABIC-IP |
| SAN | Styrene acrylonitrile copolymer comprising 15-25 wt. % acrylonitrile, bulk processed, with a nominal melt flow of 5.5 g/10 min at 230° C./1.2 KG. | SABIC-IP |

Electroplated PC/ABS parts are typically subjected to a multitude of tests to predict their performance in end-use electroplate applications. Some of these tests include thermal-cycle, thermal-shock, gravelometer testing etc. The electroplate adhesion values achieved between the metal and the plastic substrate is also considered an indicator of performance in these applications. American Chemical Platers (ACP) standardized plaques are typically used for testing and determining the adhesion values of electroplate to the plastic substrate. According to these procedures, ACP plaques molded from PC/ABS or ABS formulations of interest are typically put through a conventional electroplating process, followed by a determination of the resulting electroplate adhesion values on a modified universal testing machine, where the electroplated metal layers are scored, and bound by a tape, followed by a 90° pull using a modified jig. This data is then used to determine the load vs. distance curve, resulting in a quantitative adhesion value expressed in units of LBF/in (or N/cm).

In the following examples, PC/ABS blends comprising a polybutadiene based secondary impact modifier were compared to a conventional PC/ABS blend that did not comprise a secondary impact modifier. Specifically, Table 2 below illustrates the various formulations used in the comparison. ACP plaques were molded using the formulations in Table 2. The molded plaques were then etched and electroplated at A-BRITE Industries in Cleveland, Ohio. The ACP plaques were run through a 5 bath etch process and a 7 bath etch process at A-BRITE, to represent the low and the high in terms of the surface etch time typically associated with PC/ABS formulations. The 90° adhesion pull test was conducted at Sabic Innovative Plastics facility in Washington, W. Va.

Sample sets B1, B2, B3 and C1, C2, C3 have a secondary impact modifier phase incorporated over the base formulations. Sample set B has 2.5 and 5% loading of MBS (MBS Dow Chemical), and sample set C has 2.5 and 5% loading of emulsion ABS from KUMHO, HR181. As can be seen from the results in FIG. 1, incorporation of a second butadiene-containing impact modifier results in higher adhesion values in certain cases, e.g. the 54% PC samples, A3, B3 and C3, where B3 and C3 have a higher adhesion value than the base formulation A3.

Figure 2:
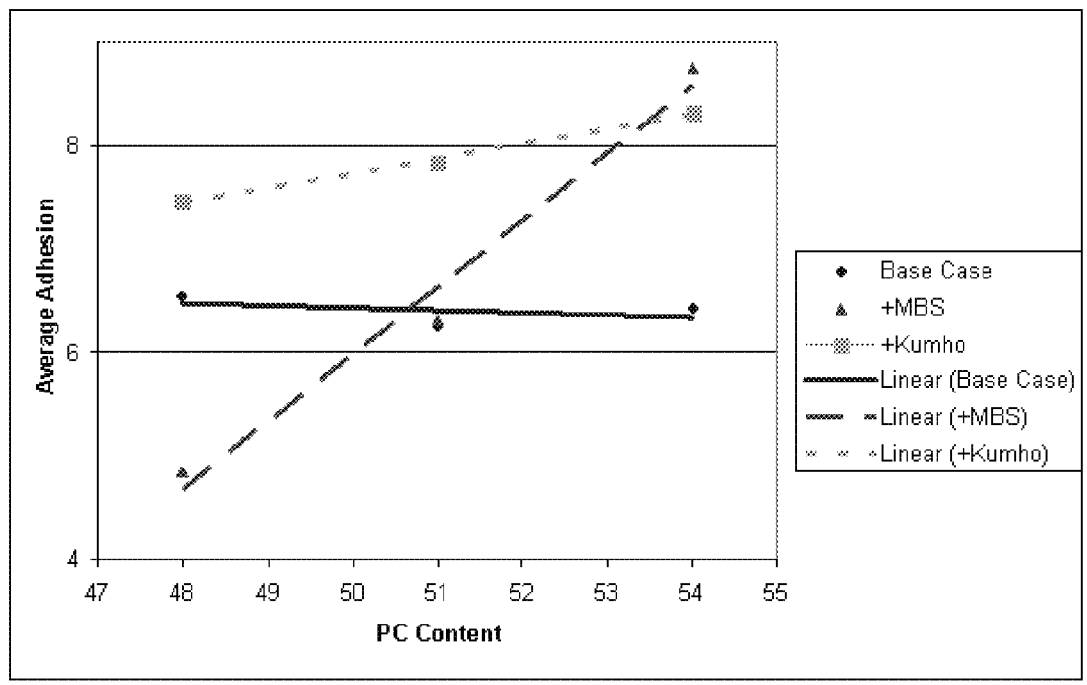
FIG. 2 is a linear regression of the data set forth in FIG. 1, graphically illustrating the corresponding increase in electroplate adhesion for disclosed thermoplastic compositions as the relative weight percent of polycarbonate component within the blend increases.

A comparison of the data in FIG. 1 illustrates the surprising results that the additional or secondary impact modifier results in an increase in electroplate adhesion. Furthermore, the presence of the secondary impact modifier also unexpectedly enables an increase in adhesion value with increasing PC content, e.g. comparing samples B1, B2 and B3. This is highly unexpected since the electroplate adhesion is typically expected to decrease with increasing PC content in a PC/ABS blend. The data show that sample B3>B2>B1 in terms of adhesion values as well as PC content. A linear regression of the data set forth in FIG. 1 graphically illustrating the corresponding increase in electroplate adhesion as the relative weight percent of polycarbonate component increases is further illustrated in FIG. 2.

The data in Table 3 below show average electroplate adhesion for compositions comprising a polycarbonate composition, a first ABS impact modifier, and a second impact modifier. The inclusion of a second impact modifier that is an ABS composition results in marked in improvement electroplate adhesion, whereas in the example below, if the impact modifier is a MBS composition there is no apparent improvement in the electroplate composition.

TABLE 2

| # | Raw Material | Source | A1 | A2 | A3 | B1 | B2 | B3 | C1 | C2 | C3 |
|---|---|---|---|---|---|---|---|---|---|---|---|
| 1 | PC1 + PC2 | SABIC-IP | 48 | 51 | 54 | 48 | 51 | 54 | 48 | 51 | 54 |
| 2 | ABS1 | SABIC-IP | 52 | 49 | 46 | 47 | 46.5 | 41 | 47 | 46.5 | 41 |
| 3 | MBS | Dow Chemical | 0 | 0 | 0 | 5 | 2.5 | 5 | 0 | 0 | 0 |
| 4 | ABS2 | Kumho | 0 | 0 | 0 | 0 | 0 | 0 | 5 | 2.5 | 5 |
| | TOTAL | | 100 | 100 | 100 | 100 | 100 | 100 | 100 | 100 | 100 |

Formulations A1, A2, and A3 are the base formulations with 48, 51, and 54% PC content respectively. These formulations have only one impact modifier, SABIC ABS. As can be seen from the ACP plaque adhesion values in FIG. 1, increasing PC content did not cause any significant change (7 station etch) or results in a slight decrease (5 station etch) in the adhesion values in samples A1, A2, and A3.

TABLE 3

| # | Raw Material | Source | D0 | D1 | D2 | D3 |
|---|---|---|---|---|---|---|
| 1 | PC1 + PC2 | SABIC-IP | 51 | 51 | 51 | 51 |
| 2 | ABS1 | SABIC-IP | 49 | 46.5 | 46.5 | 46.5 |
| 3 | MBS | Dow Chemical | 0 | 2.5 | 0 | 0 |

TABLE 3-continued

| # | Raw Material | Source | D0 | D1 | D2 | D3 |
|---|---|---|---|---|---|---|
| 4 | ABS2 | Kumho | 0 | 0 | 2.5 | 0 |
| 5 | ABS3 | SABIC-IP | 0 | 0 | 0 | 2.5 |
| | Average Adhesion (LBF/in) | | 6.2 | 6.2 | 7.9 | 7.2 |

Further data on the effect of second impact modifier is shown in Table 4 below. The inclusion of two impact modifiers that are both not ABS results in a decreased electroplate adhesion compared to a composition comprising a single ABS impact modifier (e.g. compare sample E2 to E1 or sample F2 to F1).

TABLE 4

| # | Raw Material | Source | E1 | E2 | F1 | F2 |
|---|---|---|---|---|---|---|
| 1 | PC1 + PC2 | SABIC-IP | 49 | 49 | 44 | 44 |
| 2 | BABS | SABIC-IP | 0 | 13 | 0 | 13 |
| 3 | MBS | Dow Chemical | 0 | 15 | 0 | 15 |
| 4 | ABS5 | SABIC-IP | 28 | 0 | 0 | 0 |
| 5 | ABS4 | SABIC-IP | 0 | 0 | 28 | 0 |
| 6 | SAN | SABIC-IP | 23 | 23 | 28 | 28 |
| | Average Adhesion (LBF/in) | | 8.1 | 7.3 | 9.6 | 6.6 |

Without wishing to be bound by a particular theory, the data suggest that a composition comprising first and second impact modifier, wherein each impact modifier is an ABS composition, provides for improved electroplate adhesion over a broad range of polycarbonate levels. In contrast, a first impact modifier that is an ABS composition and a second impact modifier that is an MBS composition provide improved electroplate adhesion at higher polycarbonate levels (e.g. above about 51%).

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A thermoplastic composition with improved electroplate adhesion comprising from about 40 wt % to about 75 wt % of two or more polycarbonate resins, from about 24 wt % to about 53 wt % of a first impact modifier, and from about 1 wt % to about 7 wt % of a second impact modifier; wherein the thermoplastic composition further comprises a hydrolytic stabilizer comprising an inorganic buffer, and wherein the combined weight percent value of all components does not exceed 100 wt %; wherein all weight percent values are based on the total weight of the composition; and wherein the composition exhibits an adhesion value at least 10% greater than that of a reference composition consisting essentially of substantially the same proportions of the same polycarbonate polymers and the same first impact modifier.

2. The composition of claim 1, wherein the polycarbonate resins are present in an amount from about 45 wt % to about 55 wt %.

3. The composition of claim 1, wherein the first impact modifier is present in an amount from about 40 wt % to about 48 wt %.

4. The composition of claim 1, wherein the first impact modifier is an acrylonitrile butadiene styrene terpolymer.

5. The composition of claim 4, wherein acrylonitrile butadiene styrene terpolymer has a butadiene content of about 25 wt % to about 55 wt %.

6. The composition of claim 1, wherein the second impact modifier is present in an amount from about 3 wt % to about 6 wt %.

7. The composition of claim 1, wherein the second impact modifier is methyl methacrylate butadiene styrene.

8. The composition of claim 7, wherein the methyl methacrylate butadiene styrene has a butadiene content of about 70 wt % to 78 wt %.

9. The composition of claim 1, wherein the second impact modifier is emulsion polymerized acrylonitrile-butadiene-stryrene.

10. The composition of claim 1, wherein the second impact modifier is an acrylonitrile butadiene styrene terpolymer.

11. The composition of claim 10, wherein acrylonitrile butadiene styrene terpolymer has a butadiene content of about 40 wt % to about 65 wt %.

12. The composition of claim 1, wherein the first impact modifier is an acrylonitrile butadiene styrene terpolymer; and wherein the second impact modifier is an acrylonitrile butadiene styrene terpolymer different than the first impact modifier.

13. The composition of claim 1, wherein the first impact modifier is an acrylonitrile butadiene styrene terpolymer; and wherein the second impact modifier is a methyl methacrylate butadiene styrene.

14. The composition of claim 1, wherein the composition exhibits an adhesion value at least 20% greater than that of a reference composition.

15. The composition of claim 1, wherein the composition exhibits an adhesion value of greater than or equal to 6 lbs/in.

16. The composition of claim 1, wherein the hydrolytic stabilizer further comprises one or more hydrotalcites comprising a magnesium hydrotalcite.

17. An article comprising the composition of claim 1.

18. An article of claim 17, wherein the article is used in automotive applications.

19. An article of claim 18, wherein the article is selected from the group consisting of an instrument panel, overhead console, interior trim, center console, panel, quarter panel, rocker panel, trim, fender, door, deck lid, trunk lid, hood, bonnet, roof, bumper, fascia, grille, minor housing, pillar appliqué, cladding, body side molding, wheel cover, hubcap, door handle, spoiler, window frame, headlamp bezel, headlamp, tail lamp, tail lamp housing, tail lamp bezel, license plate enclosure, roof rack, and running board.

20. An article of claim 17, wherein the article exhibits an adhesion value of greater than or equal to 6 lbs/in.

21. A process to improve the electroplate adhesion of a thermoplastic composition, the process comprising combining at least two polycarbonate resins, a first impact modifier, and a second impact modifier;
   wherein the at least two polycarbonate resins are combined in an amount of from about 45 wt % to about 55 wt % of the total composition;
   wherein the first impact modifier is combined in an amount of from about 40 wt % to about 48 wt %;

wherein the second impact modifier is combined in an amount of from about 1 wt % to about 7 wt %;
wherein the thermoplastic composition further comprises a hydrolytic stabilizer comprising an inorganic buffer, and
wherein the combined weight percent value of all components does not exceed 100 wt %;
wherein all weight percent values are based on the total weight of the composition; and
wherein the composition exhibits an adhesion value at least 10% greater than that of a reference composition consisting essentially of substantially the same proportions of the same polycarbonate polymers and the same first impact modifier.

22. The process of claim 21, wherein the composition exhibits an adhesion value at least 20% greater than that of a reference composition.

23. The process of claim 21, wherein the composition exhibits an adhesion value at least 30% greater than that of a reference composition.

24. The process of claim 21, wherein the composition exhibits an adhesion value at least 40% greater than that of a reference composition.

25. A thermoplastic composition with improved electroplate adhesion comprising from about 45 wt % to about 68 wt % of two or more polycarbonate resins, from about 31 wt % to about 48 wt % of a first impact modifier, and from about 1 wt % to about 7 wt % of a second impact modifier; wherein the thermoplastic composition further comprises a hydrolytic stabilizer comprising an inorganic buffer, and wherein the combined weight percent value of all components does not exceed 100 wt %; wherein all weight percent values are based on the total weight of the composition; and wherein the composition exhibits an adhesion value at least 10% greater than that of a reference composition consisting essentially of substantially the same proportions of the same polycarbonate polymers and the same first impact modifier.

26. A thermoplastic composition with improved electroplate adhesion comprising from about 48 wt % to about 58 wt % of two or more polycarbonate resins, from about 39 wt % to about 45 wt % of a first impact modifier, and from about 1 wt % to about 7 wt % of a second impact modifier; wherein the thermoplastic composition further comprises a hydrolytic stabilizer comprising an inorganic buffer, and wherein the combined weight percent value of all components does not exceed 100 wt %; wherein all weight percent values are based on the total weight of the composition; and wherein the composition exhibits an adhesion value at least 10% greater than that of a reference composition consisting essentially of substantially the same proportions of the same polycarbonate polymers and the same first impact modifier.

27. The composition of claim 1, wherein the inorganic buffer comprises one or more inorganic salts capable of pH buffering and having a pKa value in aqueous solution of about 5.0 to about 7.0 at a temperature of about 20° C.

28. The composition of claim 1, wherein the inorganic buffer is essentially free of nitrogen containing species.

29. The composition of claim 1, wherein at least two polycarbonates differ from one another in terms of molecular weight.

30. The process of claim 21, wherein at least two polycarbonates differ from one another in terms of molecular weight.

31. The composition of claim 25, wherein at least two polycarbonates differ from one another in terms of molecular weight.

32. The composition of claim 26, wherein at least two polycarbonates differ from one another in terms of molecular weight.

33. The process of claim 21, wherein the first impact modifier is an acrylonitrile butadiene styrene terpolymer; and wherein the second impact modifier is an acrylonitrile butadiene styrene terpolymer different than the first impact modifier.

34. The composition of claim 25, wherein the first impact modifier is an acrylonitrile butadiene styrene terpolymer; and wherein the second impact modifier is an acrylonitrile butadiene styrene terpolymer different than the first impact modifier.

35. The composition of claim 26, wherein the first impact modifier is an acrylonitrile butadiene styrene terpolymer; and wherein the second impact modifier is an acrylonitrile butadiene styrene terpolymer different than the first impact modifier.

36. A thermoplastic composition with improved electroplate adhesion comprising from about 40 wt % to about 75 wt % of two or more polycarbonate resins having different molecular weights, from about 24 wt % to about 53 wt % of a first impact modifier, and from about 1 wt % to about 7 wt % of a second impact modifier; and wherein the combined weight percent value of all components does not exceed 100 wt %; wherein all weight percent values are based on the total weight of the composition; and wherein the composition exhibits an adhesion value at least 10% greater than that of a reference composition consisting essentially of substantially the same proportions of the same polycarbonate polymers and the same first impact modifier.

* * * * *